United States Patent

Stelck

[15] 3,650,186
[45] Mar. 21, 1972

[54] CAMERA PROVIDING EXPOSURES OF MULTIPLE AREAS OF A PHOTOGRAPHIC MEDIUM

[72] Inventor: Lionel L. Stelck, Motley, Minn.
[73] Assignee: Multi-Photo Camera Corporation, Eden Prairie, Minn.
[22] Filed: Aug. 3, 1970
[21] Appl. No.: 60,362

[52] U.S. Cl. .................................................95/1.1, 95/37
[51] Int. Cl. .........................................................G03b 17/24
[58] Field of Search ................................95/1.1, 36, 37, 38

[56] References Cited

UNITED STATES PATENTS 2,827,832  3/1958  Patterson.................................95/1.1

Primary Examiner—John M. Horan
Attorney—Edward H. Loveman

[57] ABSTRACT

A camera assembly for making a composite photograph of different images positioned at different predetermined areas of a light sensitive medium comprising a camera body having a lens carrier rotatably disposed on its front wall; a vertically movable film holder at the rear of the camera body and a data card holder rotatably mounted at the sides of the camera body and coupled to the lens so that when the card holder is raised the lens shifts laterally. The film holder is adapted to be shifted vertically to a different position for producing another composite photograph. A lamp for illuminating the object being photographed is inside the camera body. The level of illumination is automatically varied upon operation of a switch by the lens carrier when it is rotated. Another switch is provided for switching between external and internal power supplies for the lamp.

10 Claims, 4 Drawing Figures

PATENTED MAR 21 1972

INVENTOR.
LIONEL L. STELCK

BY
Edward H. Loveman
ATTORNEY 3,650,186

CAMERA PROVIDING EXPOSURES OF MULTIPLE AREAS OF A PHOTOGRAPHIC MEDIUM

This invention relates to photographic cameras of the type in which a plurality of exposures are made on selected areas of film or plate of fixed size, and more particularly the invention concerns such a camera wherein a lens is selectively movable into alignment with one of a plurality of sections of film to be exposed.

Cameras of this type are generally used for making identification or passport photographs or the like. Such cameras generally have the limitation that they cannot be quickly and interchangeably used for photographing a person and an identification card to form a composite photograph upon which the person's picture will appear along with the identification data.

The present invention involves a single lens camera capable of exposing successively two or more different areas of a single frame or plate of a light sensitive medium. In this way, it is possible to include both graphic data and pictorial images on a single photographic film or plate in a manner not possible with a conventional single lens camera. As one example, a driver's license or identification card can be made bearing both a picture of an individual and a variety of pertinent graphic data and printed information. The present camera makes it possible to photograph a person on a predetermined portion of a photographic medium and then to photograph graphic data upon another portion of the same medium. It is possible to photograph different images on any number of different areas of the same photographic medium.

In accordance with the present invention, the camera assembly is comprised of a lens carrier which is laterally moved by raising a card holder vertically before the lens, this movement automatically provides for a change in the level of illumination upon the objective by the lateral positioning of the lens. Additionally, the invention provides means for moving the film holder at the rear of the camera to move the sensitive film to a new position so that a second composite photograph may be produced.

It is therefore a principal object of the present invention to provide a single lens camera assembly capable of exposing a plurality of selected areas of a single frame of light sensitive film or plate to impress a plurality of different images on the respective areas.

Another object of the present invention is to provide a camera of the type described in which a holder for a sheet or card bearing graphic data may be moved into place in front of the camera lens, and in which the camera lens shifts in coordination with movement of the sheet holder, to expose a preselected area of the light sensitive film.

Another object of the present invention is to provide a camera of the type described provided with means for lighting the object being photographed, and with means for automatically changing the light level according to the character of object being photographed.

Another object of the present invention is to provide a camera of the type described, with a movable film support and with means for moving the film support so that different areas of the film will be exposed.

A further object of the present invention is to provide a camera of the type described, adapted for operation by an external power supply or by internal batteries, with means for recharging the batteries by the external power supply.

A still further object of the present invention is to provide a camera of the type described which is relatively small in size, light in weight, durable in construction, simple and reliable in operation, and economical to manufacture.

These and other objects and many of the attendant advantages of this invention will be readily appreciated as the same becomes better understood by reference to the following detailed description when considered in connection with the accompanying drawings in which.

Figure 1:
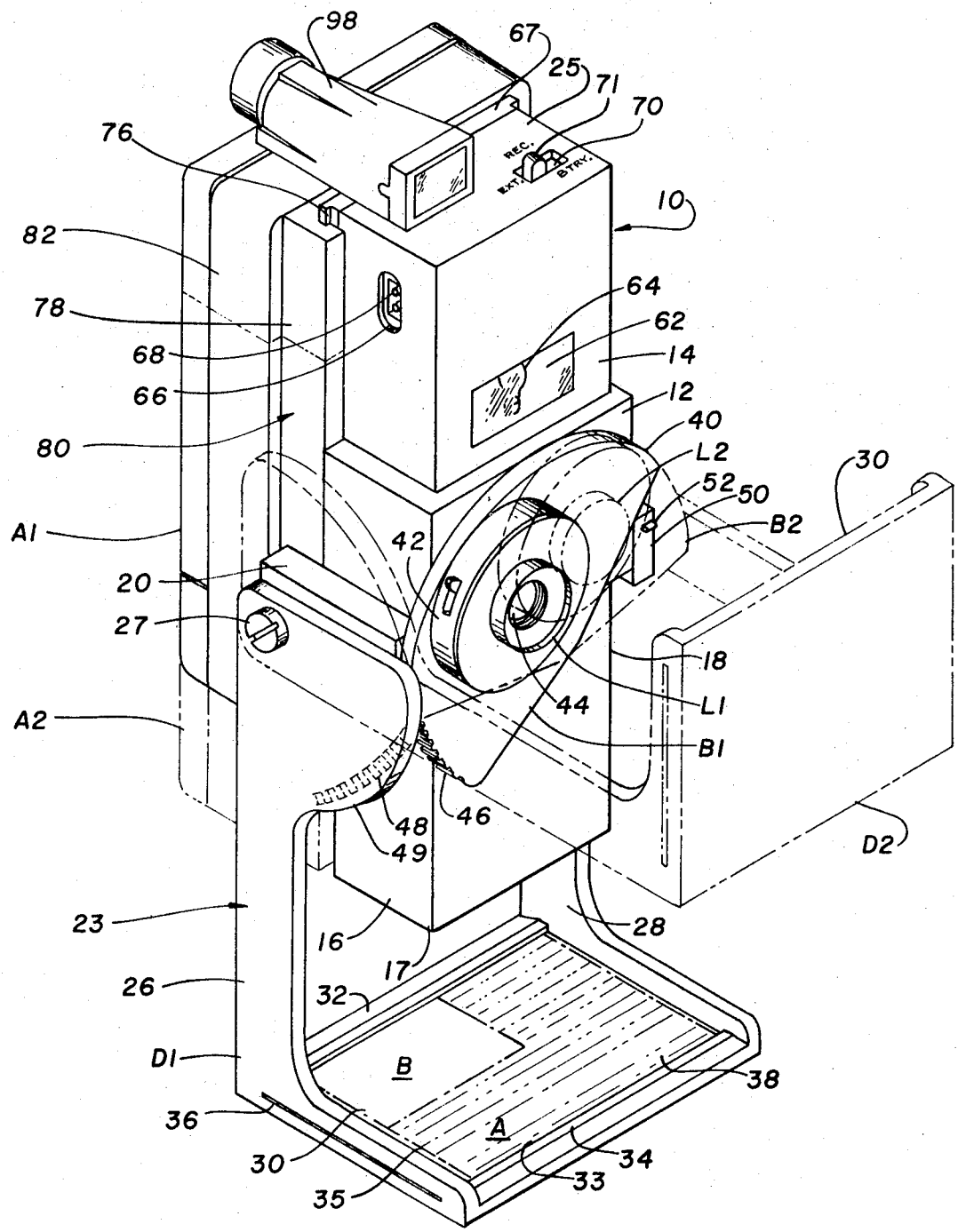
FIG. 1 is an isometric view showing the front, side and top of a camera assembly embodying the instant invention.
Figure 2:
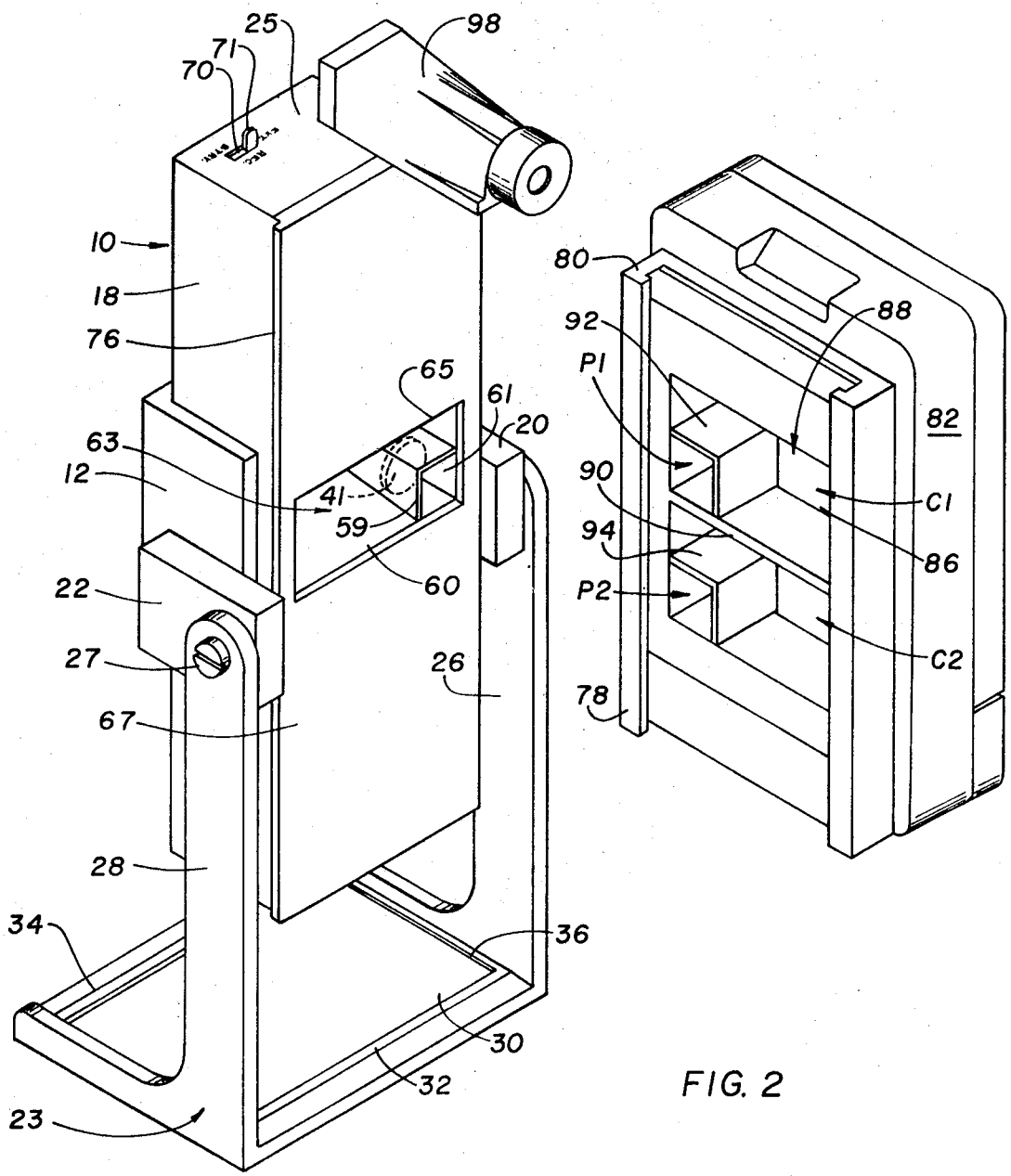
FIG. 2 is an exploded isometric view showing the rear of the camera assembly of FIG. 1 with film pack detached.

Referring now to the drawings wherein like reference characters designate like or corresponding parts throughout, there is illustrated in FIGS. 1 and 2 a rectangular hollow camera body or housing generally designated by reference numeral 10 disposed in an upright vertical position. A central portion 12 of the body 10 projects forwardly of a vertical front wall 14 and has a pair of side walls 16, 18, intermediate a horizontal top wall 25 and a bottom wall 17 of the housing 10. A pair of bracket plates 20, 22 are secured to the sides of the body portion 12 and a data card holder generally designated by reference numeral 23 in the form of a rectangular U-shaped yoke has side arms 26, 28 pivotally secured by bolts 27 to the plates, 20, 22 to rotate in a vertical plane. The side arms 26, 28 are joined together by an integral flat cross plate 30 which serves as a support for a sheet or card 35 adapted to be photographed. Plate 30 is rectangular with opposite edges of the plate 30 formed with channels 32, 34 spaced above plate 30 at the inner edges thereof to define grooves 33 in which the sheet or card 35 may be engaged. The sheet or card may be inserted through a slot 36 formed in side arm 26 and registering with the upper side of plate 30. This card may have indicia and other graphic data 38 written or printed in one generally L-shaped area A while an adjacent corner area B is clear.

Rotatably mounted on the housing 10 is a lens and shutter carrier 40 in the form of a sector plate. A disk shaped shutter 42 and lens 44 are mounted on the carrier plate 40 to revolve around the axis of rotation of the plate. The peripheral edge of carrier plate 40 is formed with gear teeth 46 which engage with mating teeth 48 formed on the inner forwardly extending portion 49 of the yoke arm 26. When the card holder 23 is rotated 90° upwardly and forwardly from the solid line position D1 shown in FIG. 1 to the dotted line position D2, the plate 30 assumes a vertical position so that card 35 may now be photographed.

As the card holder 23 is rotated through 90° the carrier plate 40 and lens 44 are rotated therewith by the meshing gear teeth 46 and 48.

A switch 50 is mounted on the body 10 and is connected to a circuit inside the body 10. The switch has an operating arm 52 which is contacted and depressed by the carrier plate 40 when it is rotated clockwise from the solid line position B1 to the dotted line position B2. Plate 40 rotates in a vertical plane parallel to the front wall 14 of the housing and carries the lens 44 and the shutter 42 in an arcuate path between a solid and dotted line position L1 and L2, respectively shown in FIG. 1. The front of the body section 12 has openings (not shown) through which optical paths are defined between the lens 44 and an interior compartment 60 (FIG. 2) of the camera housing 10 at the two laterally spaced positions of the lens. A partition 59 divides the compartment 60 into a corner passage 61 and a larger passage 63. Within passage 61 is a permanently focused lens 41 which conjointly with lens 44 permits photographing of a subject (approximately five feet in front of the camera) when card holder 23 is in the lowered position, D1. It should be noted here that the lens 44 need not be refocused in order to photograph the data card 35 when the holder 23 is in the raised position, D2. A window 62 (FIG. 1) is provided at the front of the camera housing 10 behind which is a lamp 64. The lamp 64 is connected in circuit with the switch 50 so that the intensity of light emitted by the lamp is changed whenever the card holder 23 is raised or lowered as will be more fully described below in connection with FIG. 3. A socket 66 (FIG. 1) is provided in side wall 16 and has electrical terminals 68 to which an external power supply may be connected by a suitable plug and power cord (not shown). On the top wall 25 of the camera body is a switch 70 having an operating lever 71 which may be selectively positioned for changing between the external power supply, and batteries which are installed inside the camera body. (not shown)

The rear of the camera body is enclosed by a removable rectangular plate 67, which has rabbeted lateral edges 76 extending beyond side walls 16, 18 for engaging side channels 78 of a frame 80. Attached to the rear of the frame 80 is a casing 82 containing a film pack of the self developing type. The light sensitive side of a film 86 (FIG. 2) is exposed to the interior of a compartment 88 in the casing 82. Casing 82 has a horizontal partition 90 dividing the compartment 88 into upper and lower chambers C1, C2. Further partitions 92, 94 at corners of the two chambers defined passages P1, P2 for exposing two rectangular areas of predetermined size to the film 86. The frame 80 along with the casing 82 and film pack may be moved vertically on the tracks defined by edges of plate 67 between the upper solid line position A1 shown in FIG. 1 and the lower dashed line position A2. In the upper position, lower chamber C2 will be aligned with and exposed to the lens 44 via passage 63. In the lower position, upper chamber C1 will be aligned with and exposed to the lens via passage 63. Passages P1, P2 will align with corner passage 61, which contains permanently focused lens 41. Although not shown, the frame 80 may be secured and aligned in each of its vertical positions by conventional locking means, e.g., spring and ball detent, etc. A viewfinder 98 is mounted on the top wall of the camera body for use when photographing objects when card holder 23 is in the lower position D1.

Figure 3:
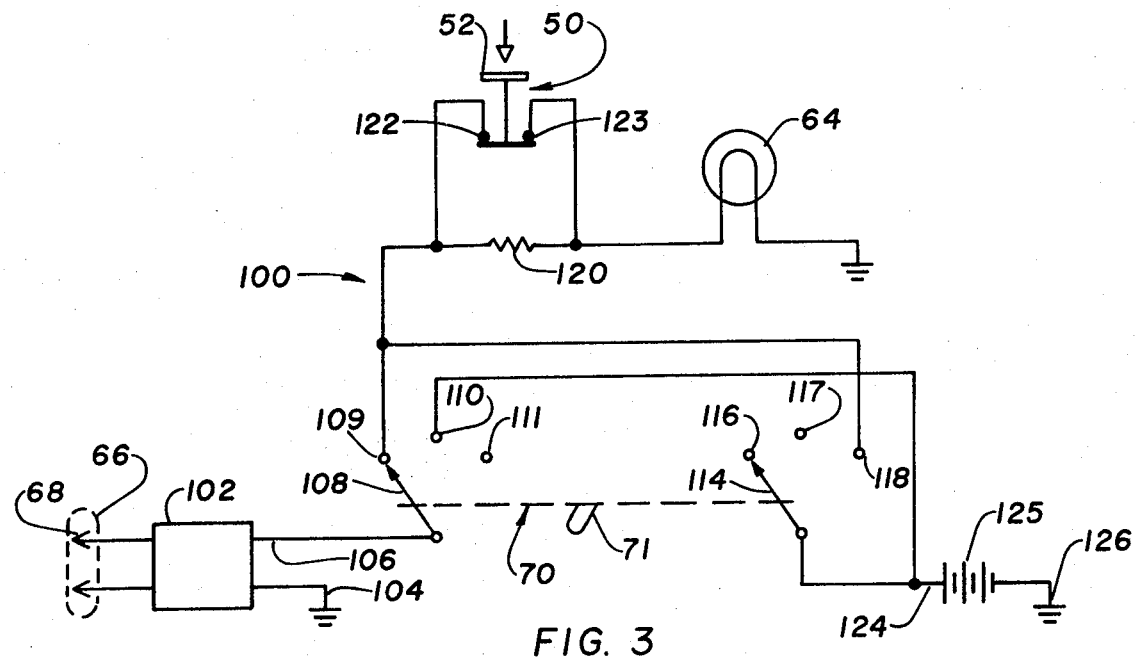
FIG. 3 is a schematic diagram of an electric circuit employed in the camera assembly of FIGS. 1 and 2.

FIG. 3 shows an electrical circuit 100 which may be incorporated in the camera assembly. An internal power pack 102 generates low voltage direct current when an external alternating voltage is applied to terminals 68 of socket 66. One terminal 104 of the power pack 102 is grounded, and the other terminal 106 is connected to a movable pole 108 of a switch 70 which may be a double-pole three-position switch having positions respectively designated EXT., REC., and BTRY. Pole 108 contacts one of the fixed contacts 109, 110 and 111 in any one of the respective three positions of the switch lever 71.

The pole 108 of the switch 70 is ganged to another pole 114 which is adapted to be coupled to respective contacts 116, 117 and 118 in the three positions of the switch lever 71. The contacts 111, 116 and 117 are open and the contact 109 is connected in parallel to the contact 118, to one end of a resistor 120 and to a terminal 122 of the switch 50. The contact 110 is connected to a terminal 124 of a battery 125 which terminal is also connected to the switch pole 114. The second terminal 126 of the battery is grounded. The contact 123 of the switch 50 is connected to the other end of the resistor 120 and to one terminal of the lamp 64 with the other terminal of the lamp being grounded.

From an inspection of FIG. 3, it will be apparent that the lamp 64 will be energized by the external power supply when the lever 71 of switch 70 is in the EXT. position. With the lever 71 in the REC. position the external power supply will be connected to the battery for recharging and in the BTRY. position the battery 125 will be connected in direct circuit with the lamp 64 for energization thereof. In the normal closed position of the switch 50, the resistor 120 will be short circuited so that a high voltage will be applied to the lamp 64 and more intense illumination will be afforded to a person being photographed while the yoke 26 is in a lowered position. When the yoke 26 is raised and carrier plate 40 is rotated to actuate switch arm 52, switch 50 will open removing the short circuit across resistor 120 such that the voltage applied to lamp 64 will be reduced and less intense illumination will be emitted for illuminating card 35 on the holder plate 30.

Figure 4:
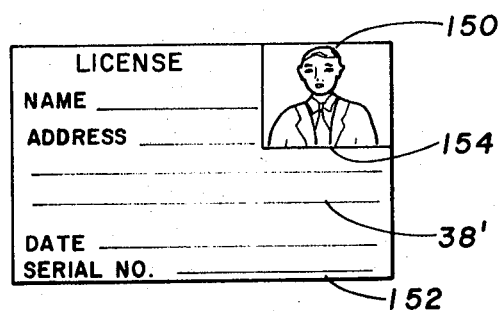
FIG. 4 is a perspective view of an identification card as made by the instant camera assembly.

When a person is being photographed while the frame 80, the casing 82, and the film pack are in the upper position shown A1 in FIG. 1, only a corner of the film 86 will be exposed. A person's picture 150 (FIG. 4) will appear on an identification card 152 confined to a limited corner area 154. When the holder 23 is raised, only the remaining unexposed area of the film will be exposed to the data on card 35. The photographed data 38' will appear as shown on photographed card 152 occupying the L-shaped remainder of the card. This may occupy as much as three quarters of the area of the photograph.

When the frame 80 is lowered to position A2 along with the casing 82 and film pack, the upper chamber C1 of the casing will be exposed to the lens 40 in its two lateral positions L1, L2. Thus, another identification card may be produced photographically bearing a picture in one corner section and graphic data in another L-shaped section. Two identity cards may be produced from a single film of the film pack. It is of course possible to provide more than two compartments in casing 82 with two chambers in each so that three, four and more multiple section photographs may be obtained from the same film or photographic plate. Roll film in a suitable holder may be substituted for the flat film pack. For any one film frame, a multiplicity of sections or areas may be selectively and individually exposed.

By arrangement described, a license card or identification card may easily and quickly be produced photographically. In the lowered position of the data card holder 23, a picture of an individual facing the camera may be snapped. In the raised position of the holder 23, the written and printed data on card 35 may be photographed. When self developing film is employed, the completely developed and printed card is available in a few minutes. Two identification cards 152 of two individuals may be produced in rapid succession. The card 35 on the holder 23 may be replaced or modified for each individual to be photographed.

The camera assembly described can be made up in convenient size, for example, approximately 12 inches long, 6 inches wide and about 6 inches thick. It may weigh less than 5 pounds so that it is handy to hold and operate. Since it has a self-contained lighting system, no adjustment is required of the lens which will be prefocused for photographing a person as well as a data card on holder 23.

It should be understood that the foregoing relates to only a preferred embodiment of the invention, and that it is intended to cover all changes and modifications of the example of the invention herein chosen for the purposes of the disclosure, which do not constitute departures from the spirit and scope of the invention.

The invention claimed is:

1. A camera assembly for photographing a plurality of different images on different portions of a light sensitive medium comprising
   a camera housing having a front and rear wall and a pair of oppositely spaced side walls and a top and a bottom wall,
   a permanently focused lens means mounted within said housing focused on a first portion of said light sensitive medium,
   a carrier supported on said housing, for movement to one of at least two different spaced positions,
   a lens and shutter assembly mounted on said carrier and opening optically into said housing and assuming each of said spaced positions when said carrier is moved thereto,
   a holder for a data bearing member movably secured to said housing,
   means mutually engaging said carrier and said holder such that said carrier moves in coordination with said holder for disposing said holder in front of said lens and shutter assembly and for disposing said holder out of the way of said lens and shutter assembly,
   support means for holding said light sensitive medium in a flat position at said read wall whereby said first portion of said medium is exposed through said housing, said permanently focused lens and said lens and shutter assembly when said carrier is in one of said two different spaced positions and a second portion of said medium is exposed through said housing and said lens and shutter assembly when said carrier is in the second of said two spaced positions.

2. A camera assembly as defined in claim 1, wherein said carrier is a circular sector plate, and wherein said holder is a rectangularly Usshaped yoke having side arms pivotally secured to said sides of said camera housing, and wherein said means mutually engaging said carrier and said holder comprise mutually engaging gear means on said plate and on one of said side arms, and said yoke having a flat portion for supporting a data card to be photographed.

3. A camera assembly as defined in claim 1, further comprising
an illumination means carried by said camera housing; and
a switch carried by said camera housing and connected in circuit with said illumination means for changing the level of illumination when said switch is operated.

4. A camera assembly as defined in claim 3, wherein said switch is disposed on said front wall for actuation by said carrier when it is moved from one position to another position so that the level of illumination is changed automatically.

5. A camera assembly as defined in claim 1, wherein said support means for supporting said light sensitive medium is movable to a different position along said rear wall so that a different section of said medium may be exposed in each of said positions whereby another composite photograph may be produced.

6. A camera assembly as defined in claim 1, further comprising
an illumination means carried by said camera housing,
a battery power supply located in said camera housing
a connector means on said housing for connecting an external power supply thereto,
a circuit means connecting said connector and said battery power supply in circuit with said illumination means; and
switch means on said camera housing and connected in said circuit for alternately selectively connecting said external power supply to said battery power supply or connecting said battery power supply to said illumination means or connecting said external power supply to said illumination means for energization thereof.

7. A camera assembly as defined in claim 6, further comprising another switch on said housing connected in circuit with said illumination means for changing the level of illumination when said other switch is operated, said other switch being disposed on said front wall for actuation by said carrier when it is moved from one position to another position so that the level of illumination is changed automatically.

8. A camera assembly as defined in claim 1, further comprising a frame slidably mounted on said rear wall and movable to different positions along said rear wall; said support means for said light sensitive medium comprising a casing secured to said frame and divided by partitions into different compartments each having at least two separate chambers with a different area of said medium exposed in each of said chambers; said housing having partition means defining passages alignable with said chambers.

9. A camera assembly as defined in claim 8, wherein said carrier is a sector plate, and wherein said holder is a rectangularly U-shaped yoke having side arms pivotally secured to said sides of said camera housing, and wherein said means mutually engaging said carrier and said holder comprise mutually engaging gear means on said plate and on one of said side arms, and said yoke having a flat portion for supporting a data card to be photographed.

10. A camera assembly as defined in claim 8, further comprising a self-developing film pack on said casing and said light sensitive medium comprises a single film of said pack.

* * * * *